July 23, 1940.  F. L. GILLAN  2,208,577
LAWN MOWER
Filed April 7, 1939   2 Sheets-Sheet 1
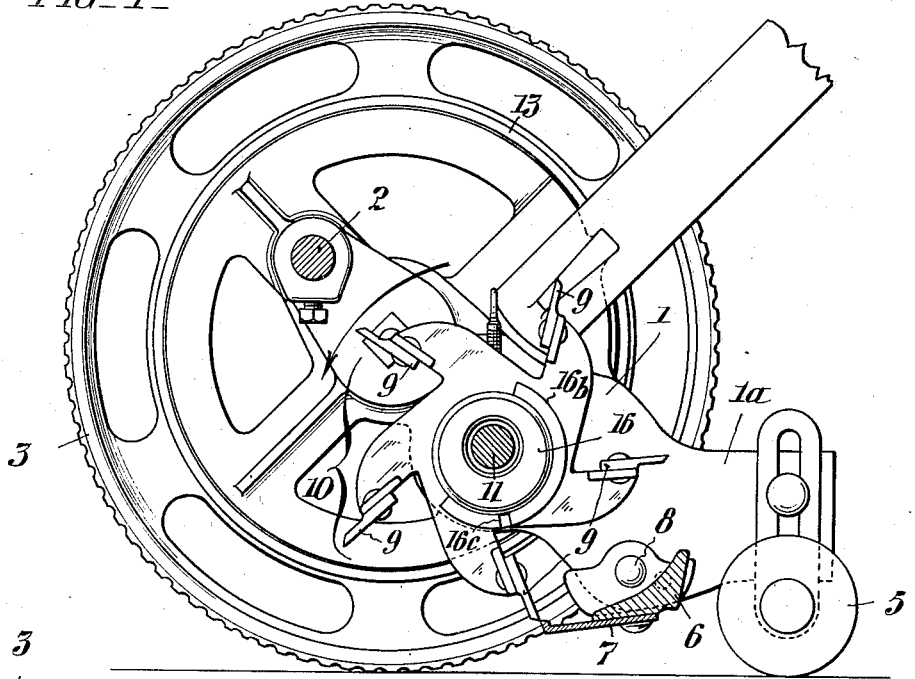
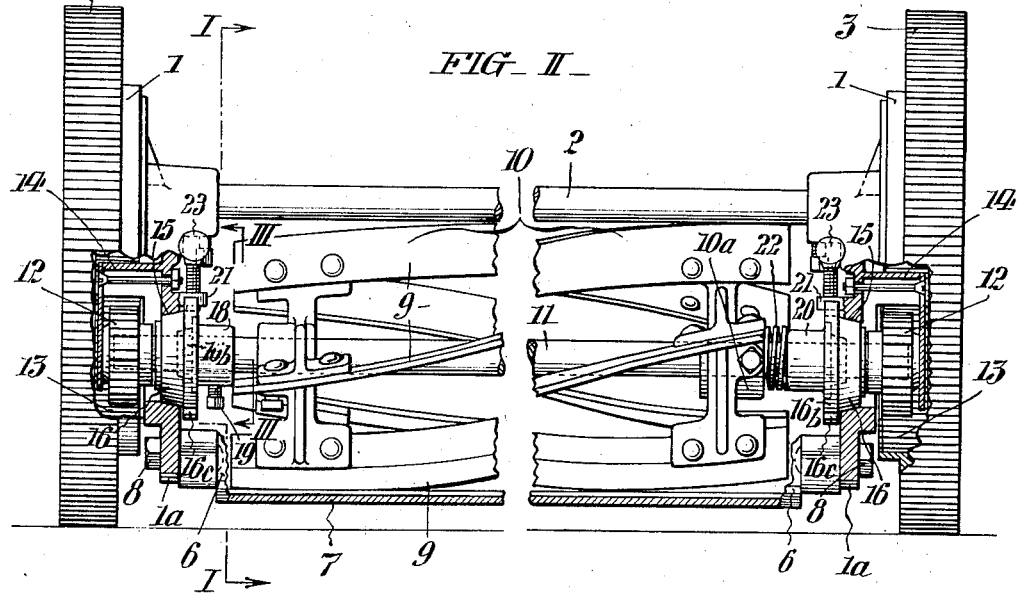
WITNESSES:
INVENTOR:
Francis L. Gillan,
BY
ATTORNEYS.

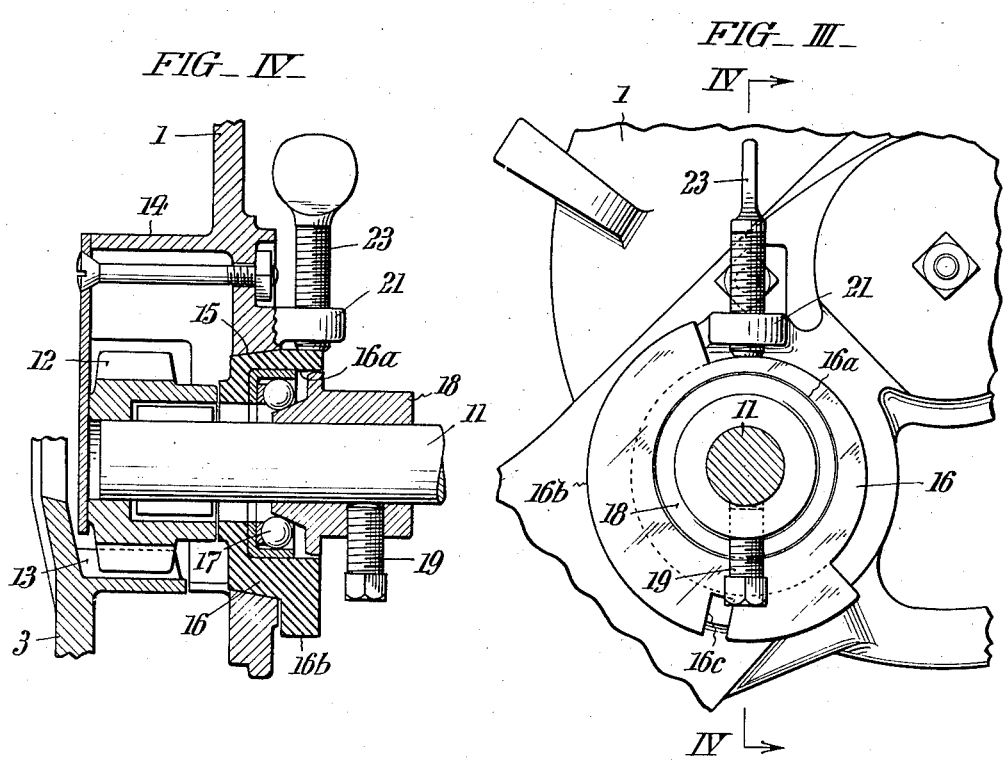

Patented July 23, 1940

2,208,577

UNITED STATES PATENT OFFICE 2,208,577

LAWN MOWER

Francis L. Gillan, Highland Park, Pa., assignor to Philadelphia Lawn Mower and Mfg. Co., Philadelphia, Pa., a corporation of Pennsylvania Application April 7, 1939, Serial No. 266,551

10 Claims. (Cl. 56—294)

This invention relates to lawn mowers; and it has reference more especially to lawn mowers of the type featured in U. S. Patent No. 1,496,129, granted to G. R. Rich, on June 3, 1924, wherein the bearings for the rotary cutting cylinder are eccentrically mounted in sleeves which are rotatively adjustable in the side frames of the mower, so that the cylinder may be bodily adjusted relative to the fixed blade of the mower for the purposes of securing proper shearing action therewith initially and to compensate for wear when necessary. In the patent, the sleeves are lodged in split bosses on the side frames fitted with clamp bolts. This clamping arrangement not only adds considerably to the cost of the side frames of the mower, but entails loss of time in making the adjustments of the cutting cylinder by reason of the necessity for loosening and tightening the clamp bolts.

The chief aim of my invention is to obviate the above drawbacks, which objective I attain in practice as hereinafter more fully disclosed, through provision of conical bearing sleeves which engage unbroken inwardly-tapered openings in the side frames, and means for exerting yielding pressure axially upon said sleeves so that they are maintained, by friction, against the possibility of accidental rotation in adjusted positions.

Other objects and attendant advantages will appear from the following detailed description of the attached drawings, wherein Fig. I is a fragmentary view in section of a lawn mower conveniently embodying my invention, the section being taken as indicated by the arrows I—I in Fig. II.

Fig. II is a view showing the mower in front elevation with the center portion broken out and with portions of its side frames in section.

Fig. III is a fragmentary sectional view on a larger scale taken as indicated by the arrows III—III in Fig. II; and Fig. IV is a detail sectional view taken as indicated by the arrows IV—IV in Fig. III.

The lawn mower chosen for convenience of illustration herein is, generally speaking, of standard construction, having laterally-spaced side frames I which are rigidly connected by a cross bar 2 after common practice in the art. Suitably journaled on the side frames I are the supporting driving wheels 3; and vertically adjustable on rearward projections 1a of said side frames is the usual auxiliary supporting roller 5. Extending between the side frames I immediately ahead of the roller 5 is a bar 6 which carries the fixed cutting blade 7, and which, in this instance, is rotatively adjustable on screw studs 8 so that said blade may be accurately positioned to shear with the spiralized blades 9 of the rotary cutting cylinder 10 whereof the shaft is indicated at 11. If desired, this adjustment feature may be omitted and the bar 7 rigidly secured to the side frames. By means of toothed clutch pinions 12 respectively at the opposite ends of the shaft 11 intermeshing with internal gears 13 at the inner sides of the drive wheels 3, the cutting cylinder 10 is rotated in the direction of the arrow in Fig. I in a well known manner, during forward travel of the mower. As usual, the pinions 12 are disposed within integrally-formed protective housings 14 on the side frames I.

The improvements with which my invention is more especially concerned are as follows: Engaged in inwardly-tapering coned socket openings 15 in the side frames I are correspondingly-tapered coned bushings 16, whereof one is shown in full detail in Figs. III and IV. Each such bushing has an eccentrically-arranged recess or hollow 16a for lodgment of a ball bearing unit. The balls of the bearing units 17 at opposite sides of the mower are respectively engaged by cone collars 18 and 20 on the cylinder shaft 11, see Fig. II. Accordingly, by rotatively shifting the bushings 16 in the socket openings 15 in the side frames I the cutting cylinder can be very closely adjusted for accurate shearing action between its blades 9 and the fixed blade 7. All the requirements of practice as regards the adjustment will be satisfied within a half rotation of the bushings 16, and in order to limit said bushings to this range of adjustment, each of them is formed with a segmental flange 16b of substantially semi-circular extent whereof the ends cooperate as stops with a lateral projection or lug 21 at the inner side of the corresponding side frames I in a manner readily understood from Fig. III. As shown, the flange 16b of each bushing 16 has a circumferential notch 16c for convenience of making the rotation adjustment with the aid of an ordinary screw driver or other suitable implement as a lever.

From Fig. II it will be noted that the coned collar 18 is fixedly secured to the cutting cylinder shaft 11 by a set screw 19. The coned collar 20 is, however, free to shift endwise on the shaft 1, and between it and the hub of the corresponding end spider 10a of the cutting cylinder 10 is interposed a helical compression spring 22. The effect of the spring 22 is to urge the cylinder shaft 11 toward the left in Fig. II with the result that the coned collars 18 and 20 are maintained in pressure contact with the balls of the bearing units 17. In this way not only is lost play or looseness precluded but wear of the bearings 17 automatically compensated for throughout the life of the motor. The spring 22, moreover, in exerting lateral pressure upon the bushings 16 through the medium of the bearings 17, tends to keep said bushings in functional content with the conical surfaces of the openings 15 in the side frames 1 and thus tend to prevent their accidental rotation in adjusted positions.

As an additional or auxiliary means to fix the bushings 16 in adjusted positions, I have provided set screws 23, the threaded shanks of which engage through topped openings in the projections or lugs 21 on the side frames 1 and which bear against said bushings in the interval between the ends of their segmental flanges 16b.

Having thus described my invention, I claim:

1. In a lawn mower having a pair of parallel side frames, a transverse cutter blade supported between said frames, and a rotary shaft carrying a cutter cylinder to cooperate with said blade; cylinder adjusting means including a pair of conical bushings engaged with capacity for rotative adjustment respectively in inwardly-tapering conical socket openings in the side frames, bearings for the cylinder shaft eccentrically of the bushings, and spring means exerting pressure axially upon said bushings to maintain them in frictional contact with said socket openings and so hold them against accidental rotation in adjusted positions.

2. A lawn mower construction according to claim 1, in which the bushings are provided circumferential notches for engagement by a lever implement in making the adjustments.

3. In a lawn mower having a pair of parallel side frames, a transverse cutter blade supported between said frames, and a rotary shaft carrying a cutter cylinder to cooperate with said blade; cylinder adjusting means including a pair of conical bushings engaged with capacity for rotative adjustment respectively in inwardly tapering conical socket openings in the side frames, removable bearing units for the cylinder shaft eccentrically recessed into the bushings, and spring means exerting pressure axially upon said bearing units for communication to the bushings whereby the latter are maintained in frictional contact with said socket openings and so hold them against accidental rotation in adjusted positions.

4. In a lawn mower having a pair of parallel side frames, a transverse cutter blade supported between said frames, and a rotary shaft carrying a cutter cylinder to cooperate with said blade: cylinder adjusting means including a pair of conical bushings engaged with capacity for rotative adjustment respectively in inwardly tapering conical socket openings in the side frames, removable ball bearing units for the cylinder shaft eccentrically recessed into the bushings, a fixed bearing collar at one end of the shaft engaging the balls of one of the bearing units, a bearing collar axially free on the other end of the shaft and engaging the balls of the other bearing unit, and a spring in compression between the axially-free collar and the contiguous end of the cutting cylinder, whereby yielding pressure is exerted through said collars and the bearing units to maintain the bushings in frictional engagement with said socket openings and so hold them against accidental rotation in adjusted positions.

5. A lawn mower construction according to claim 1, in which each of the bushings is provided with a circumferential flange; and in which the notch is formed in the flange.

6. A lawn mower construction according to claim 1, in which set screws threadedly engaged in the side frames bear against the bushings to assist in securing the latter against accidental displacement in rotatively adjusted positions.

7. A lawn mower construction according to claim 1, in which each of the bushings has a segmental circumferential flange; in which the notch is formed in said flange; and in which a set screw threadedly engaged in each of the side frames bears against the corresponding bushing in the interval between the ends of its segmental flange to assist in securing it against accidental displacement in rotatively adjusted positions.

8. In a lawn mower, a pair of parallel side frames; a transverse cutter blade supported between said frames; a rotary shaft carrying a cutter cylinder to cooperate with said blade; drive gears respectively journalled in the side frames; pinions on the cylinder shaft meshing with the drive gears; bushings engaged with capacity for rotative adjustment in the side frames; bearings for the cylinder shaft eccentrically of the bushings; circumferentially spaced stops on the bushings; projections respectively on the side frames to cooperate with the stops on the bushings in limiting the extent of rotative adjustment of the latter in opposite directions, thereby to prevent unmeshing of the pinions on the one hand and binding of said pinions on the other; and means for securing the bushings against accidental displacement in rotatively adjusted positions.

9. A lawn mower construction according to claim 8, in which the stops are formed by the ends of a segmental circumferential flange on each bushing.

10. A lawn mower construction according to claim 8, in which the stops are formed by the ends of a segmental circumferential flange on each bushing; and wherein the securing means is in the form of a set screw threadedly engaged in the projection on the corresponding side frame and bearing against the bushing in the interval between the stops.

FRANCIS L. GILLAN.